(12) United States Patent
Ejzak et al.

(10) Patent No.: US 7,353,021 B2
(45) Date of Patent: Apr. 1, 2008

(54) NETWORK CONTROLLER REPLACEMENT OF INDICATION OF ONE OR MORE SPECIFIC NETWORK CONNECTIONS USABLE BY FIRST NETWORK COMPONENT IN SIGNALING MESSAGE FOR SECOND NETWORK COMPONENT WITH WILD CARD NETWORK CONNECTION INFORMATION

(75) Inventors: Richard Paul Ejzak, Wheaton, IL (US); Hong Xie, Downers Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1138 days.

(21) Appl. No.: 10/298,144

(22) Filed: Nov. 14, 2002

(65) Prior Publication Data

US 2004/0095923 A1 May 20, 2004

(51) Int. Cl.
*H04Q 7/20* (2006.01)
*H04L 12/66* (2006.01)
*H04M 7/00* (2006.01)

(52) U.S. Cl. .................. 455/426; 370/352; 379/229
(58) Field of Classification Search ............ 370/352; 455/426; 379/229
See application file for complete search history.

(56) References Cited

U.S. PATENT DOCUMENTS 6,947,737 B2 * 9/2005 Massie et al. ............ 455/426.1
7,006,436 B1 * 2/2006 Chu et al. .................. 370/230

OTHER PUBLICATIONS

3GPP Organizational Partners; IP Multimedia Subsystem (IMS), Stage 2 (Release 5); ARIB STD-T63-23.228 V5.4.0; http://www.3gpp.org; Mar. 2002; Release 5; 3GPP, 650 Route des Lucioles-Sophia Antipolis Valbonne, France.
"Request for Comments"; http://www.ietf.org/rfc.html;IETF, 1895 Preston White Drive, Suite 100, Reston, Va 20191-5434, USA; 1pg; Nov. 14, 2002.
"SDP:Session Description Protocol"; http://www.ietf.org/rfc/rfc2327.txt?number=2327; IETF, 1895 Preston White Drive, Suite 100, Reston, VA 20191-5434, USA: 37pgs; Nov. 14, 2002.
"Conventions for the use of the Session Description Protocol (SDP) for ATM Bearer Connections", http://www.ietf.org/rfc/rfc3108.txt?number=3108; IETF, 1895 Preston White Drive, Suite 100, Reston, VA 20191-5434, USA; 97pgs; Nov. 14, 2002.

(Continued)

*Primary Examiner*—Rasha S. Al-Aubaidi

(57) ABSTRACT

Apparatus in one example comprises network controller(s) that serve to communicatively couple first network component with second network component. The first network component sends signaling message for the second network component to one or more of the network controller(s). The signaling message comprises indication of specific network connection(s) usable by the first network component. One or more of the network controller(s) serve to replace the indication of the specific network connection(s) usable by the first network component in the signaling message with wild card network connection information. The one or more of the network controller(s) serve to send the signaling message that comprises the wild card network connection information to the second network component. The wild card network connection information indicates the second network component is allowed to indicate to one or more of the network controller(s) specific network connection(s) usable by the second network component.

18 Claims, 12 Drawing Sheets

OTHER PUBLICATIONS

"An Offer/Answer Model with the Session Description Protocol (SDP)"; http://www.ietf.org/rfc/rfc3264.txt?number=3264; IETF, 1895 Preston White Drive, Suite 100, Reston, VA 20191-5434, USA; 22pgs; Nov. 14, 2002.

"SIP: Session Initiation Protocol"; http://www.ietf.org/rfc/rfc3261.txt?number=3261; IETF, 1895 Preston White Drive, Suite 100, Reston, VA 20191-5434, USA; 236 pgs; Nov. 14, 2002.

* cited by examiner

NETWORK CONTROLLER REPLACEMENT OF INDICATION OF ONE OR MORE SPECIFIC NETWORK CONNECTIONS USABLE BY FIRST NETWORK COMPONENT IN SIGNALING MESSAGE FOR SECOND NETWORK COMPONENT WITH WILD CARD NETWORK CONNECTION INFORMATION

CROSS-REFERENCE TO RELATED APPLICATIONS

This application contains subject matter which is related to the subject matter of the following applications, which are assigned to the same assignee as this application. The below-listed applications are hereby incorporated herein by reference in their entireties:
"COMMUNICATION SYSTEM INCLUDING AN INTERWORKING MOBILE SWITCHING CENTER FOR CALL ORIGINATION," by Ejzak, Ser. No. 09/919,651, filed Jul. 31, 2001.
"COMMUNICATION SYSTEM INCLUDING AN INTERWORKING MOBILE SWITCHING CENTER FOR CALL TERMINATION," by Ejzak, Ser. No. 09/919,642, filed Jul. 31, 2001.
"COMMUNICATION SYSTEM FOR PROVIDING ROAMING BETWEEN AN INTERNET PROTOCOL MULTIMEDIA SYSTEM AND A CIRCUIT-SWITCHED DOMAIN," by Ejzak, Ser. No. 09/919,641, filed Jul. 31, 2001.
"PROVISION OF SERVICES IN A COMMUNICATION SYSTEM INCLUDING AN INTERWORKING MOBILE SWITCHING CENTER," by Ejzak, Ser. No. 09/919,675, filed Jul. 31, 2001.
"INTERNET PROTOCOL MULTIMEDIA SUBSYSTEM COMPONENT PROVIDING OF PACKET-SWITCHED SWITCHING FUNCTIONS TO SERVING MOBILE SWITCHING CENTER FEATURE SERVER," by Cyr, et al., co-filed herewith.
"COMMUNICATION BETWEEN USER AGENTS THROUGH EMPLOYMENT OF CODEC FORMAT UNSUPPORTED BY ONE OF THE USER AGENTS," by Ejzak, et al., co-filed herewith.

TECHNICAL FIELD

The invention relates generally to communications and more particularly to wireless communications.

BACKGROUND

Service providers are evolving the existing time division multiplexing ("TDM") based circuited networks to packet-based networks and eventually to end-to-end internet protocol telephony applications using session initiation protocol ("SIP") as the signaling protocol. A typical session initiation protocol network architecture may consist of one or more session initiation protocol back-to-back user agents ("B2BUA") and session initiation protocol user agents ("UA"). The session initiation protocol user agents employ specific network protocol technologies to communicate with other network entities. The session initiation protocol user agents employ network negotiation to set up communication with other session initiation protocol user agents.

Several network configurations exist that require network negotiation. Exemplary configurations include internet protocol ("IP") local area networks ("LANs") connected through an asynchronous transfer mode ("ATM") wide area network ("WAN"), internet protocol local area networks connected through an internet protocol wide area network, and an internet protocol local area network connected to a public switched telephone network ("PSTN") through an internet protocol wide area network.

As one shortcoming, a session initiation protocol user agent employing one network protocol technology cannot directly communicate with a session initiation protocol user agent employing a different network protocol technology. Different session initiation protocol user agents may employ different network protocol technologies. For example, session initiation protocol user agents may support network protocol technologies such as internet protocol, asynchronous transfer mode, and time division multiplexing ("TDM"). Session initiation protocol employs session description protocol ("SDP") offer/answer procedures to perform network negotiation between session initiation protocol user agents in a session initiation protocol network. If the session initiation protocol user agents do not support one or more common network protocol technologies, then session initiation protocol cannot successfully establish a communication session between the session initiation protocol user agents.

Thus, a need exists for enhanced network negotiation in a variety of network configurations.

SUMMARY

The invention in one implementation encompasses an apparatus. The apparatus comprises one or more network controllers that serve to communicatively couple a first network component with a second network component. The first network component sends a signaling message for the second network component to one or more of the one or more network controllers. The signaling message comprises an indication of one or more specific network connections usable by the first network component. One or more of the one or more network controllers serve to replace the indication of the one or more specific network connections usable by the first network component in the signaling message with wild card network connection information. The one or more of the one or more network controllers serve to send the signaling message that comprises the wild card network connection information to the second network component. The wild card network connection information indicates the second network component is allowed to indicate to one or more of the one or more network controllers one or more specific network connections usable by the second network component.

Another implementation of the invention encompasses a method. At a network controller a specific connection information parameter of a first network component is received for set up of a communication session with a second network component. At the network controller the specific connection information parameter is modified to allow the second network component to determine a specific connection information parameter of the second network component for set up of the communication session with the first network component. With the network controller a network is selected from a plurality of available networks to communicatively couple the first network component with the second network component based on one or more of the specific connection information parameters of the first network component and the specific connection information parameters of the second network component.

Yet another implementation of the invention encompasses an article. The article comprises one or more computer-readable signal-bearing media. The article comprises means in the one or more media for receiving at a network controller a specific connection information parameter of a first network component for set up of a communication session with a second network component. The article comprises means in the one or more media for modifying at the network controller the specific connection information parameter to allow the second network component to determine a specific connection information parameter of the second network component for set up of the communication session with the first network component. The article comprises means in the one or more media for selecting with the network controller a network from a plurality of available networks to communicatively couple the first network component with the second network component based on one or more of the specific connection information parameters of the first network component and the specific connection information parameters of the second network component.

DESCRIPTION OF THE DRAWINGS

Features of exemplary implementations of the invention will become apparent from the description, the claims, and the accompanying drawings in which:

DETAILED DESCRIPTION

Figure 1:
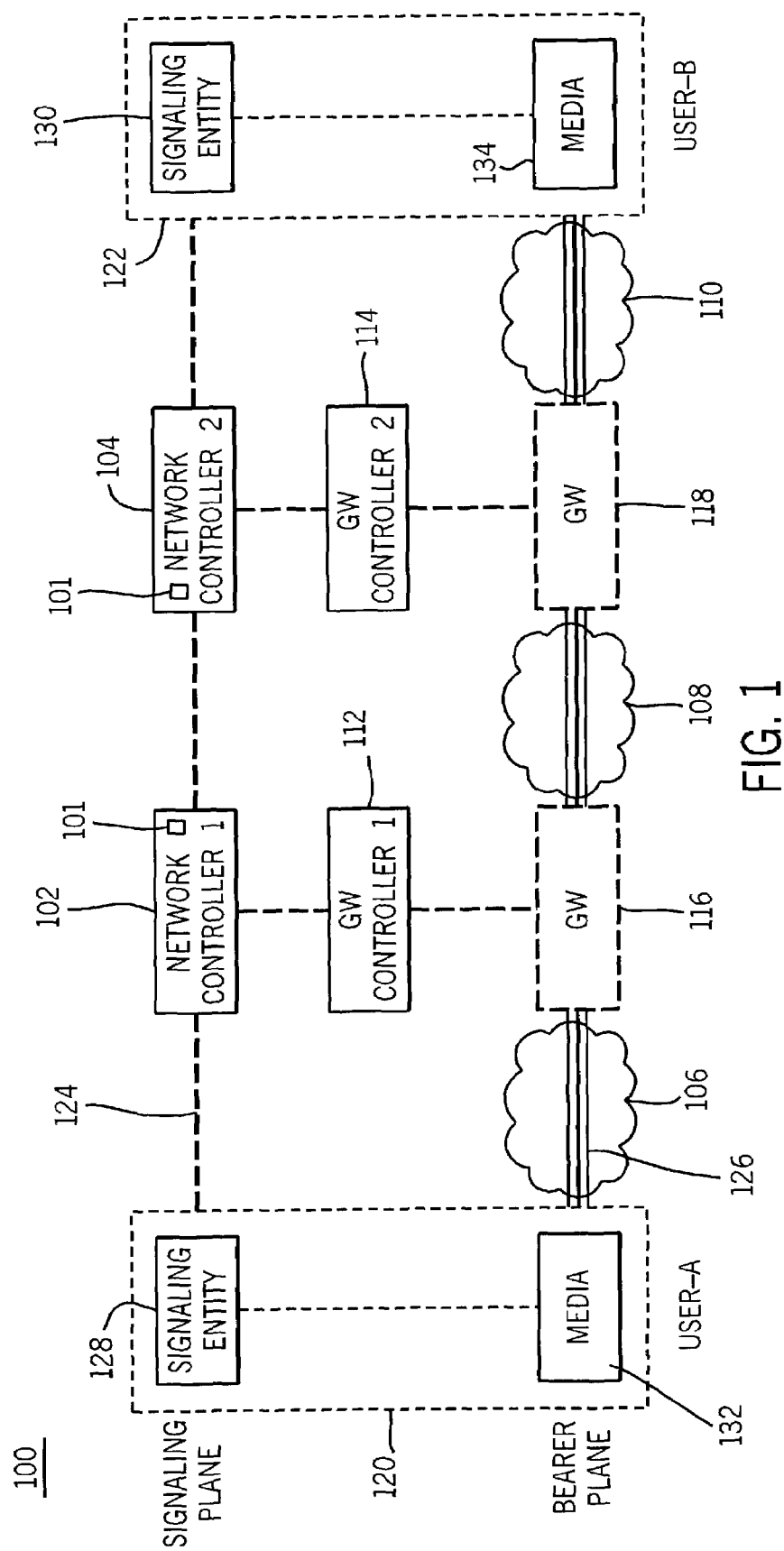
FIG. 1 is a representation of one example of an apparatus that comprises one or more network controllers and one or more networks.

Turning to FIG. 1, an apparatus 100 in one example comprises a plurality of components such as computer software and/or hardware components. A number of such components can be combined or divided in the apparatus 100.

In one example, the apparatus 100 employs one or more computer-readable signal-bearing media. One example of a computer-readable signal-bearing medium for the apparatus 100 comprises an instance of a recordable data storage medium 101 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

In one example, the apparatus 100 comprises one or more network controllers 102 and 104. The one or more network controllers 102 and 104 serve to arrange a connection between a plurality of networks 106, 108, and 110. The one or more network controllers 102 and 104 employ one or more gateway controllers ("GW controllers") 112 and 114 to allocate one or more gateways ("GWs") 116 and 118 to interface the plurality of networks 106, 108, and 110. The one or more network controllers 102 and 104 connect one or more users 120 and 122 through a signaling path 124. The plurality of networks 106, 108, and 110 connect the one or more users 120 and 122 through a bearer path 126.

The one or more network controllers 102 and 104, in one example, comprise session initiation protocol back to back user agents ("B2BUAs"). The one or more network controllers 102 and 104, in another example, comprise internet protocol multimedia subsystem ("IMS") media gateway control functions ("MGCFs"). The media gateway control functions promote interworking of different signaling protocols. The one or more user network controllers 102 and 104 communicate using a signaling protocol, for example, session initiation protocol ("SIP") or bearer independent call control ("BICC"). The one or more network controllers 102 and 104 receive and process offer/answer messages during communication setup.

In one example, the offer/answer messages comprise session description protocol ("SDP") communication messages encapsulated in session initiation protocol signaling messages or bearer independent call control signaling messages. An offer message of the offer/answer messages comprises a description of the media capabilities of an offering user agent to an answering user agent to initiate communication. An answer message of the offer/answer messages comprises a response to the offer message, for example, the answering user agent may accept the offer message with a description of its own capabilities, or may decline the offer message.

In another example, the offer/answer messages comprise integrated services digital network user part ("ISUP") communication messages. The integrated services digital network user part communication messages comprise equivalent network connection parameters to the session description protocol messages. The integrated services digital network user part communication messages describe a time division multiplexing ("TDM") trunk and a circuit identity code of the time division multiplexing trunk.

The one or more network controllers 102 and 104, are responsible for allocation of the one or more gateways 116 and 118 into the bearer path 126. In one example, one or more instances of the network 108 are available to connect the networks 106 and 110 on the bearer path 126, for example, the one or more instances of the network 108 support different network protocol technologies. The one or more network controllers 102 and 104 choose which one of the one or more instances of the network 108 to use to connect the networks 106 and 110. Based on which one of the one or more instances of the network 108 the one or more network controllers 102 and 104 determine if an instance of the one or more gateways 116 and 118 is required to interface the networks 106 and 110 with the one of the one or more instances of the network 108.

The plurality of networks 106, 108, and 110 support communication between the one or more users 120 and 122. The plurality of networks 106, 108, and 110 support communication on the bearer path 126. The plurality of networks 106, 108, and 110 comprise one or more of local area networks (LANs), metropolitan area networks ("MANs"), and wide area networks ("WANs"). The plurality of networks 106, 108, and 110 support one or more network protocol technologies, for example, internet protocol ("IP") and asynchronous transfer mode ("ATM").

The one or more gateway controllers 112 and 114 control the allocation of the one or more gateways 116 and 118. The one or more gateway controllers 112 and 114 allocate the one or more gateways 116 and 118 under direction of the one or more network controllers 102 and 104. In one example, the one or more network controllers 102 and 104 send session description protocol messages to the one or more gateway controllers 112 and 114 that cause the one or more gateway controllers 112 and 114 to allocate the one or more gateways 116 and 118.

The one or more gateways 116 and 118 facilitate the interworking of the one or more networks 106, 108, and 110. In one example, the one or more networks 106, 108, and 110 comprise a first network and a second network. The first network supports a different one of the one or more network protocol technologies than the second network, for example, the first network comprises an internet protocol network and the second network comprises an asynchronous transfer mode network. An instance of the one or more gateways 116 and 118 is required to interface the first network to the second network. The first network and second network exchange communication representing, e.g. voice media, via one or more instances of gateways 116 and 118. The instance of the one or more gateways 116 and 118 executes an internet protocol to asynchronous transfer mode conversion to generate an asynchronous transfer mode communication based on the internet protocol communication. The instance of the one or more gateways 116 and 118 sends the asynchronous transfer mode communication to the second network. Conversely, the instance of the one or more gateways 116 and 118 executes an asynchronous transfer mode to internet protocol conversion to generate an internet protocol communication based on the asynchronous transfer mode communication. The instance of the one or more gateways 116 and 118 sends the internet protocol communication to the first network.

The one or more users 120 and 122 comprise one or more of mobile telephones and landline telephones. The one or more users 120 and 122 comprise signaling components 128 and 130, and media components 132 and 134. The signaling components 128 and 130 generate, receive, and interpret signaling protocol messages, for example, session initiation protocol messages. The signaling component 128 of the user 120 and the signaling component 130 of the user 122 communicate through the signaling path 124. The media components 132 and 134 generate, receive, and interpret communication, for example, internet protocol or asynchronous transfer mode communication representing voice media. The media component 132 of the user 120 and the media component 134 of the user 122 communicate through the bearer path 126.

Figure 2:
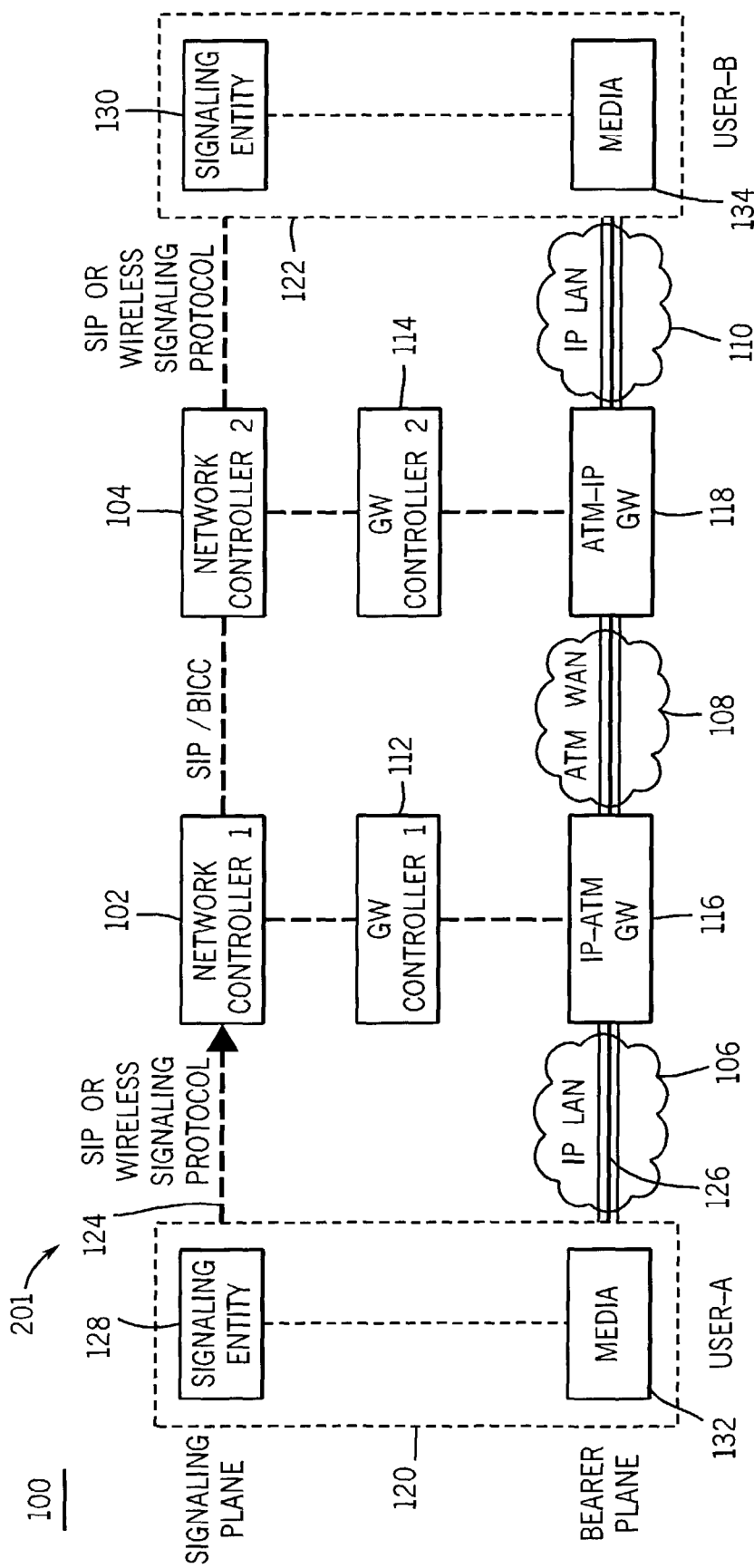
FIGS. 2-9 are representations of exemplary configurations that serves to connect the one or more networks of the apparatus of FIG. 1.

Turning to FIG. 2, exemplary configuration 201 of the apparatus 100 serves to illustrate a connection of the network 106 to the network 110 through the network 108. The networks 106 and 110 comprise internet protocol local area networks. The one or more network controllers 102 and 104 employ an asynchronous transfer mode wide area network as the network 108. The gateway 116 translates communication on the bearer path 126 from internet protocol communication to asynchronous transfer mode communication. The gateway 118 translates communication on the bearer path 126 from asynchronous transfer mode communication to internet protocol communication.

Figure 3:
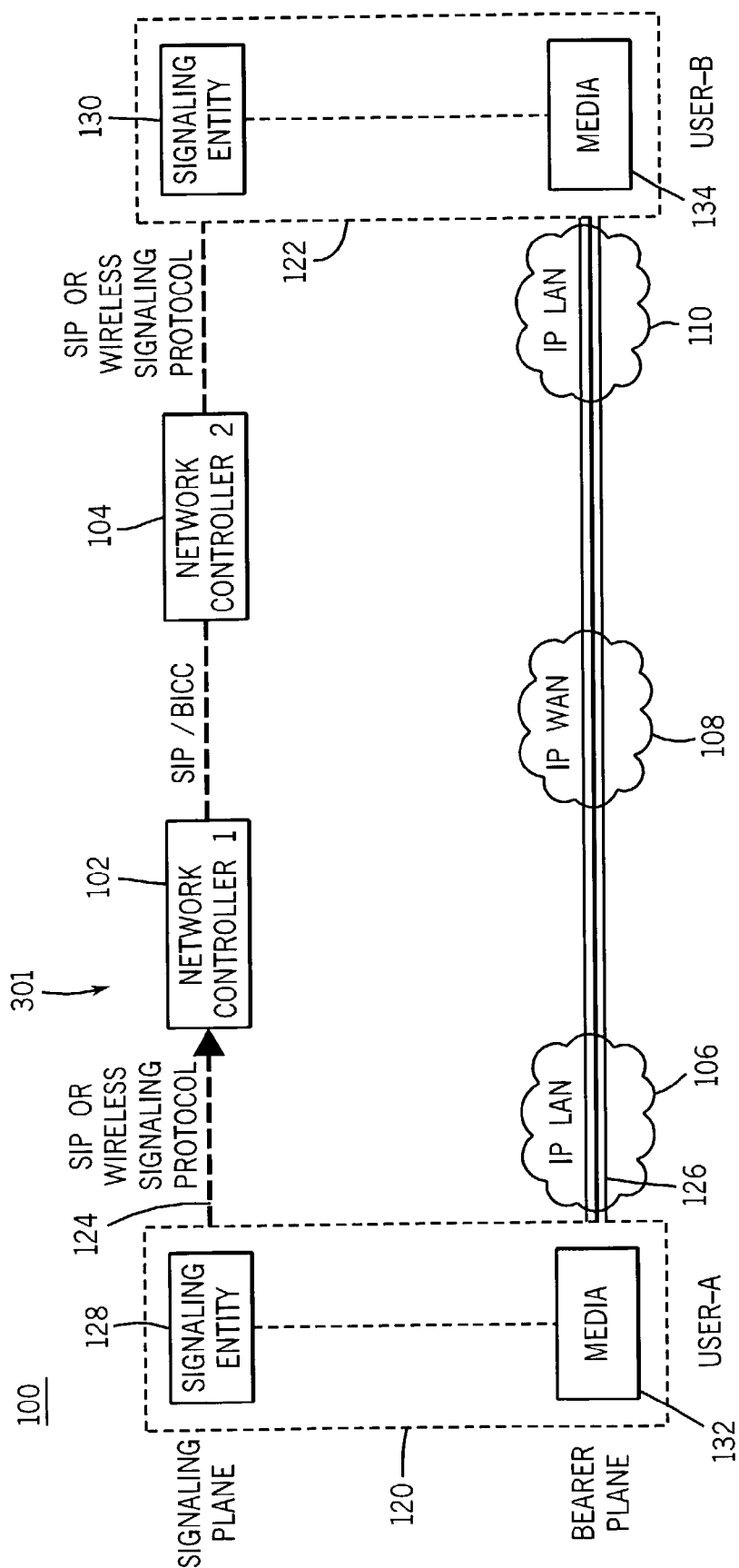

Turning to FIG. 3, exemplary configuration 301 of the apparatus 100 serves to illustrate a connection of the network 106 to the network 110 through the network 108. The configuration 301 comprises the same architecture described in the configuration 201, however the one or more network controllers 102 and 104 employ an internet protocol wide area network as the network 108. Since the networks 106, 108, and 110 support the same network protocol technology (i.e., internet protocol) translation of communication on the bearer path 126 is not required.

Figure 4:
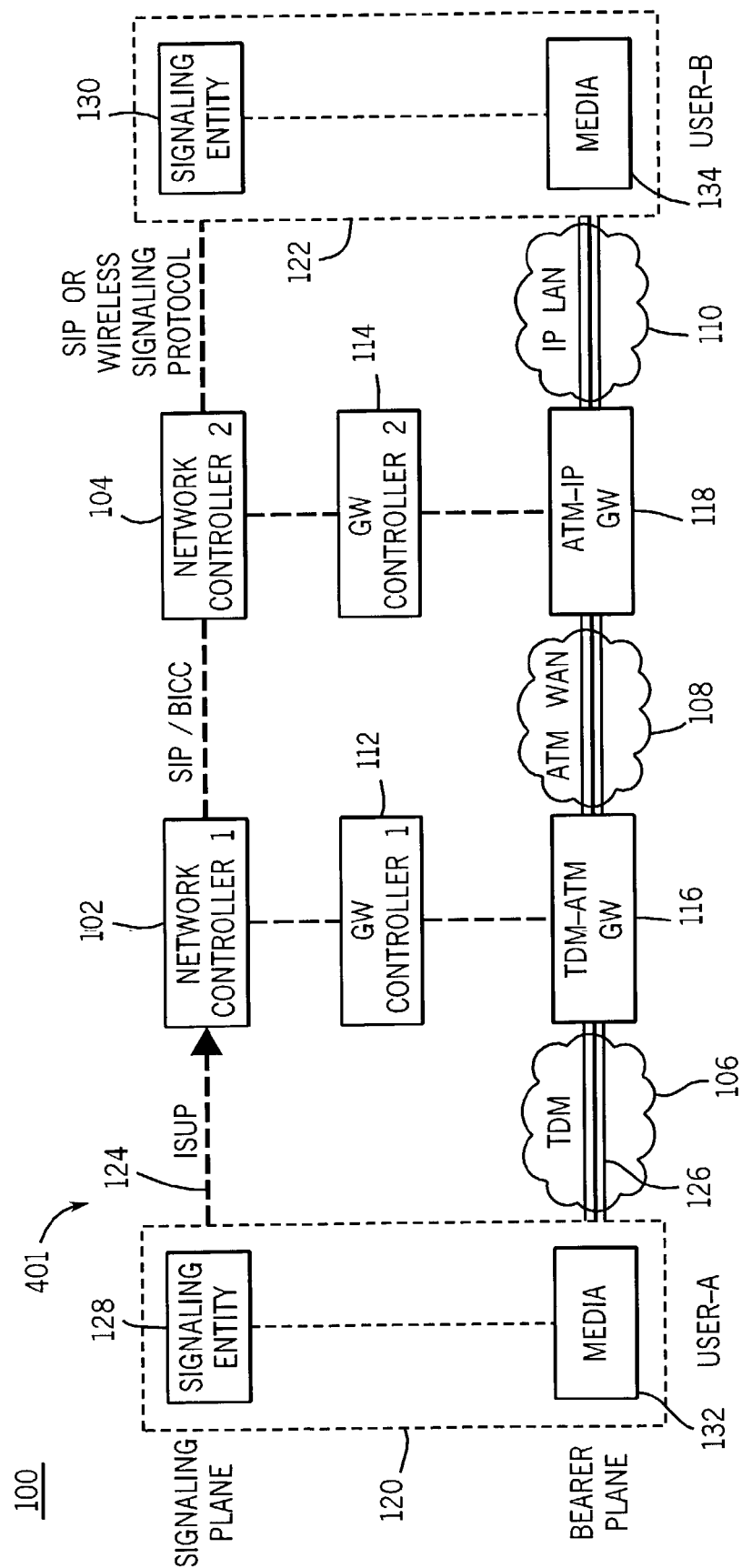

Turning to FIG. 4, exemplary configuration 401 of the apparatus 100 serves to illustrate a connection of the network 106 to the network 110 through the network 108. The network 106 comprises a time division multiplexing network, for example, a public switched telephone network ("PSTN"). The one or more network controllers 102 and 104 employ an asynchronous transfer mode wide area network as the network 108. The network 110 comprises an internet protocol local area network. The gateway 116 translates communication on the bearer path 126 from time division multiplexing communication to asynchronous transfer mode communication. The gateway 118 translates communication on the bearer path 126 from asynchronous transfer mode communication to internet protocol communication.

Figure 5:
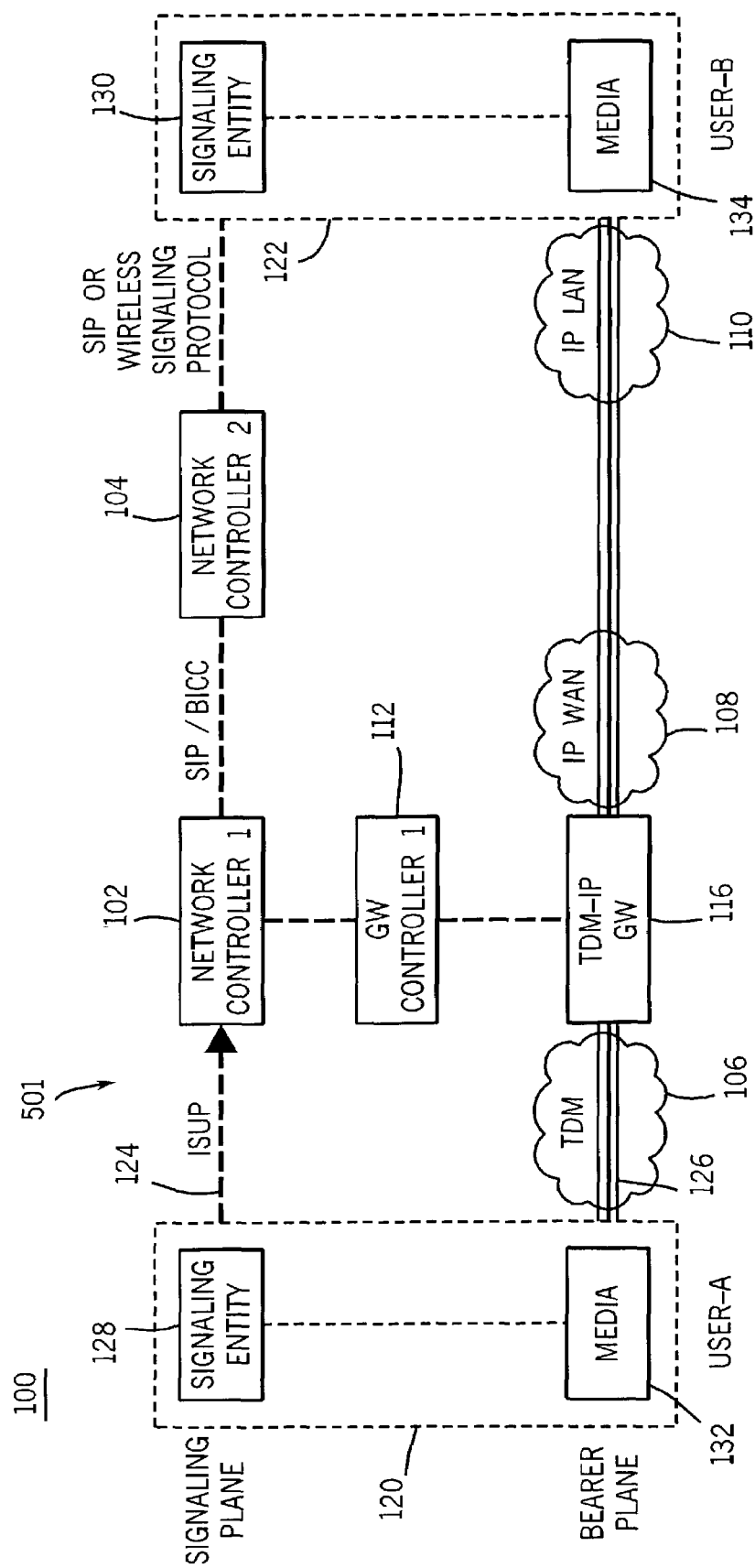

Turning to FIG. 5, exemplary configuration 501 of the apparatus 100 serves to illustrate a connection of the network 106 to the network 110 through the network 108. The configuration 501 comprises the same architecture described in the configuration 401, however the one or more network controllers 102 and 104 employ an internet protocol wide area network as the network 108. Since the networks 108 and 110 support the same network protocol technology (i.e., internet protocol) translation of communication between the networks 108 and 110 on the bearer path 126 is not required.

Figure 6:
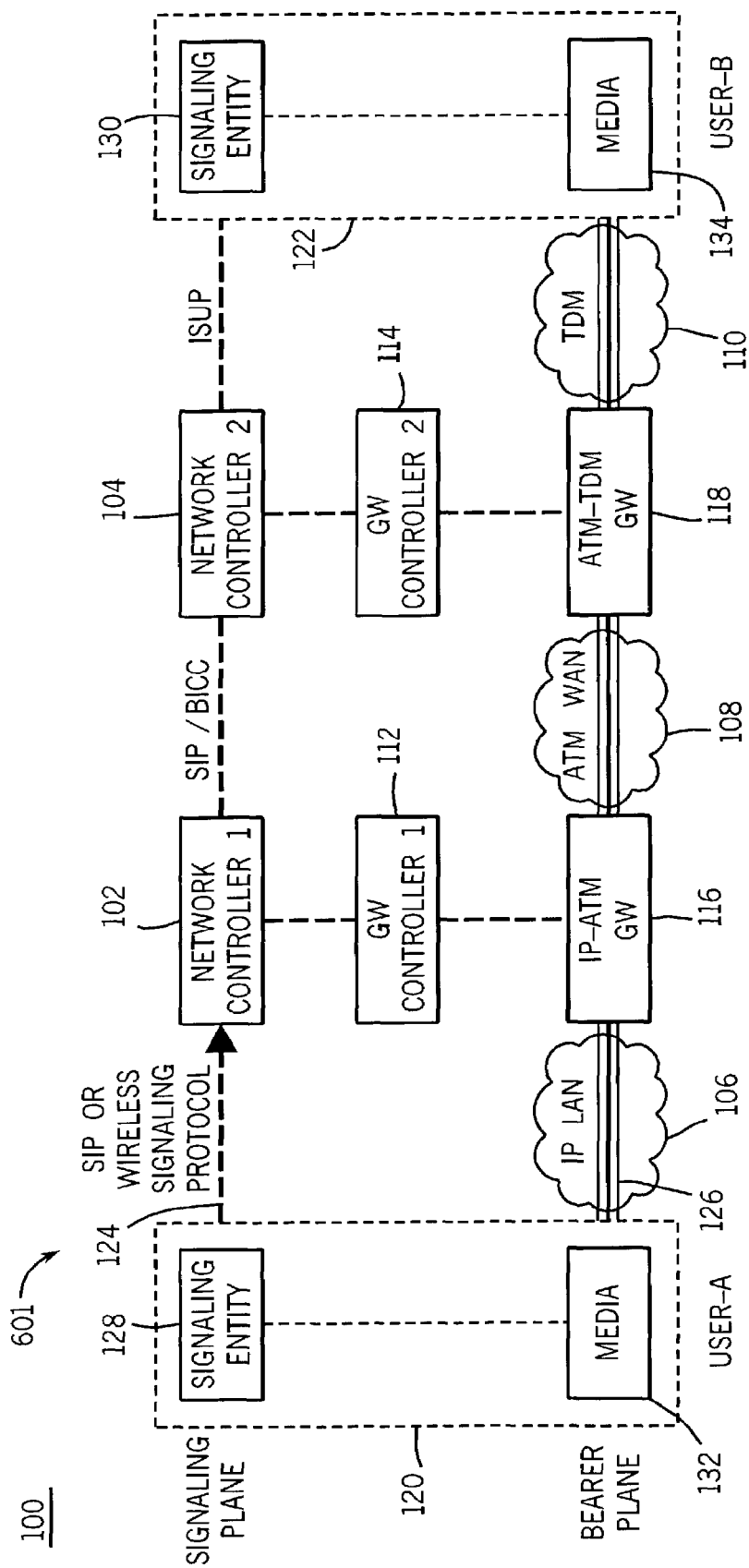

Turning to FIG. 6, exemplary configuration 601 of the apparatus 100 serves to illustrate a connection of the network 106 to the network 110 through the network 108. The network 106 comprises an internet protocol local area network. The one or more network controllers 102 and 104 employ an asynchronous transfer mode wide area network as the network 108. The network 110 comprises a time division multiplexing network, for example, a public switched telephone network. The gateway 116 translates communication on the bearer path 126 from internet protocol communication to asynchronous transfer mode communication. The gateway 118 translates communication on the bearer path 126 from asynchronous transfer mode communication to time division multiplexing communication.

Figure 7:
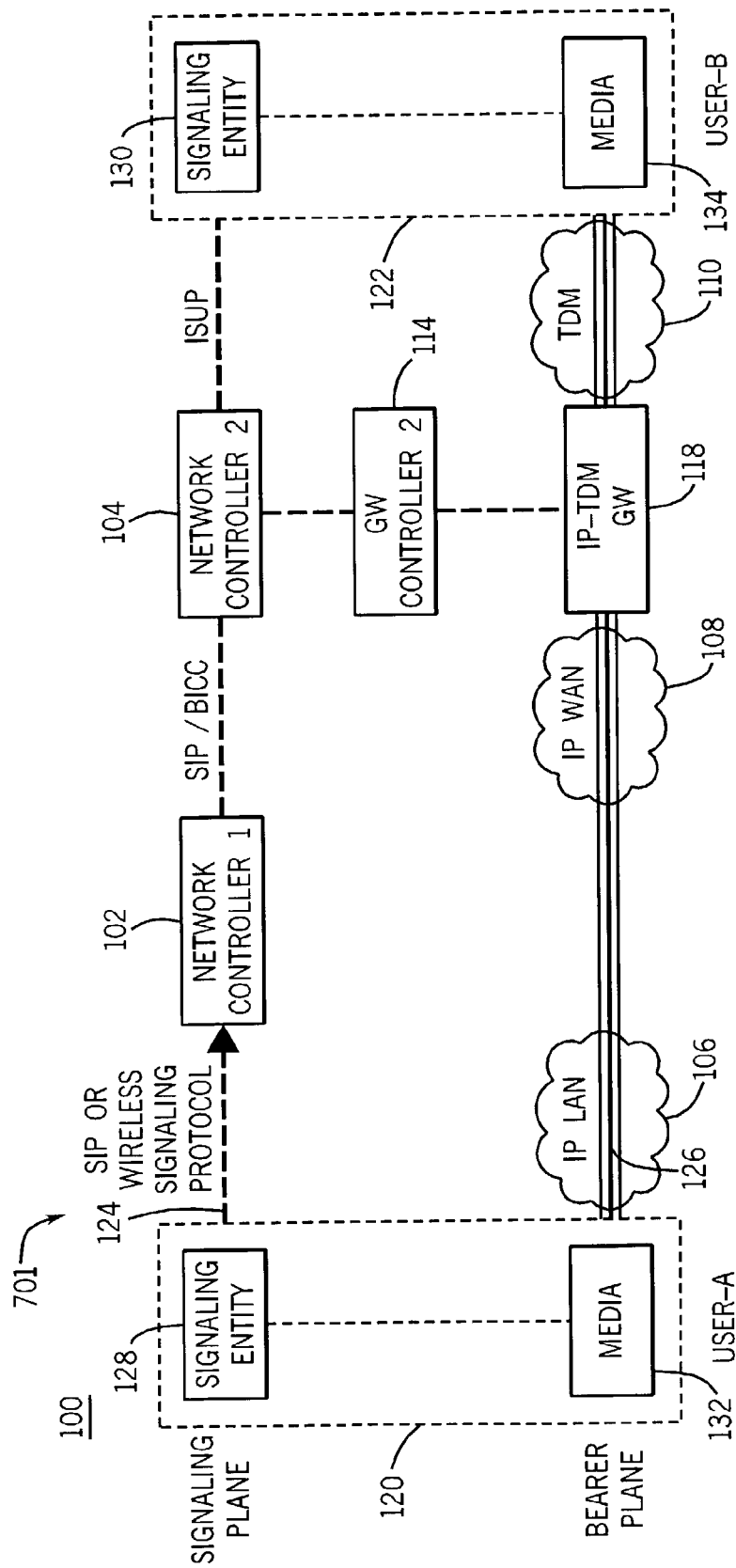

Turning to FIG. 7, exemplary configuration 701 of the apparatus 100 serves to illustrate a connection of the network 106 to the network 110 through the network 108. The configuration 701 comprises the same architecture described in the configuration 601, however the one or more network controllers 102 and 104 employ an internet protocol wide area network as the network 108. Since the networks 106 and 108 support the same network protocol technology (i.e., internet protocol) translation of communication between the networks 106 and 108 on the bearer path 126 is not required.

Figure 8:
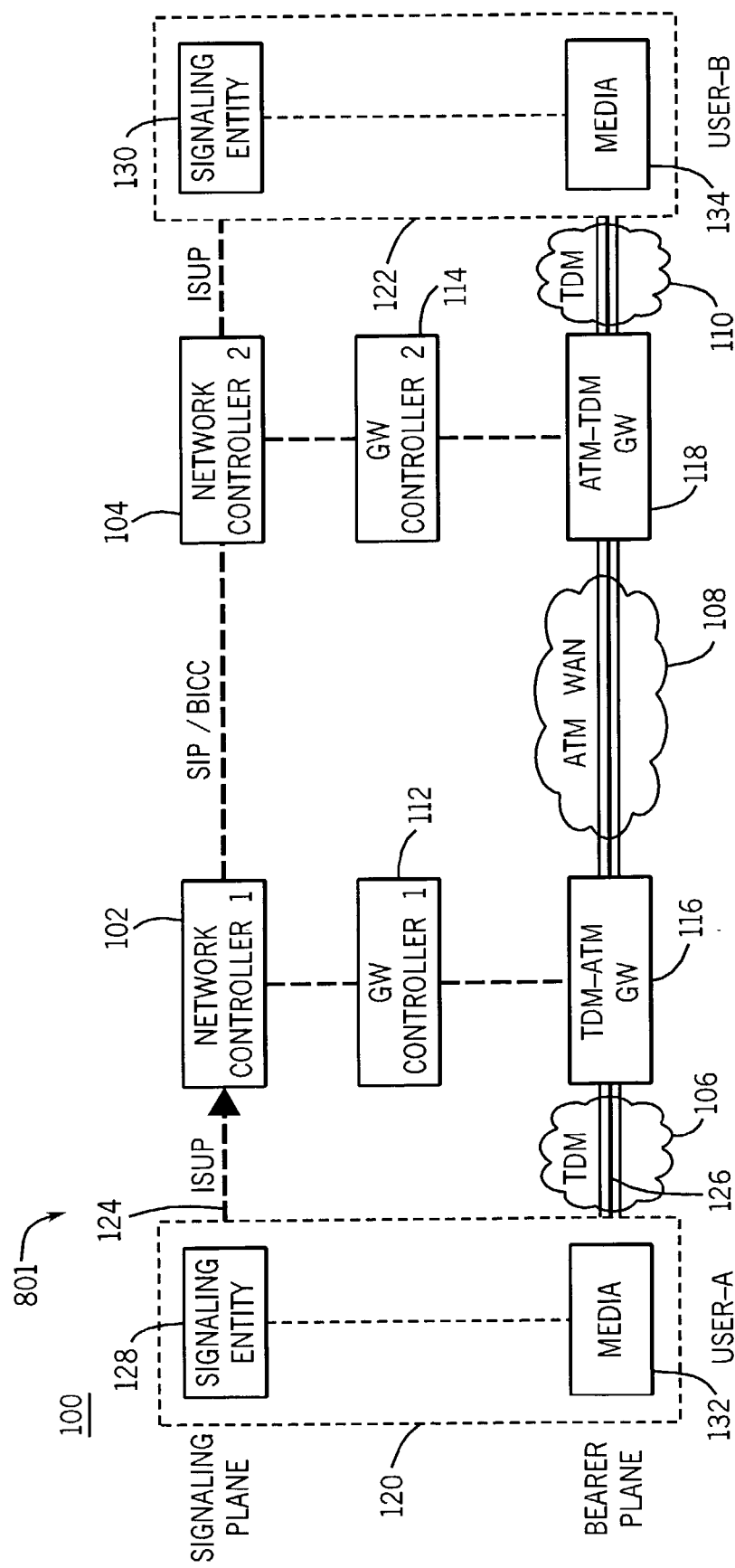

Turning to FIG. 8, exemplary configuration 801 of the apparatus 100 serves to illustrate a connection of the network 106 to the network 110 through the network 108. The networks 106 and 110 comprise time division multiplexing networks, for example, public switched telephone networks. The one or more network controllers 102 and 104 employ an asynchronous transfer mode wide area network as the network 108. The gateway 116 translates communication on the bearer path 126 from time division multiplexing communication to asynchronous transfer mode communication. The gateway 118 translates communication on the bearer path 126 from asynchronous transfer mode communication to time division multiplexing communication.

Figure 9:
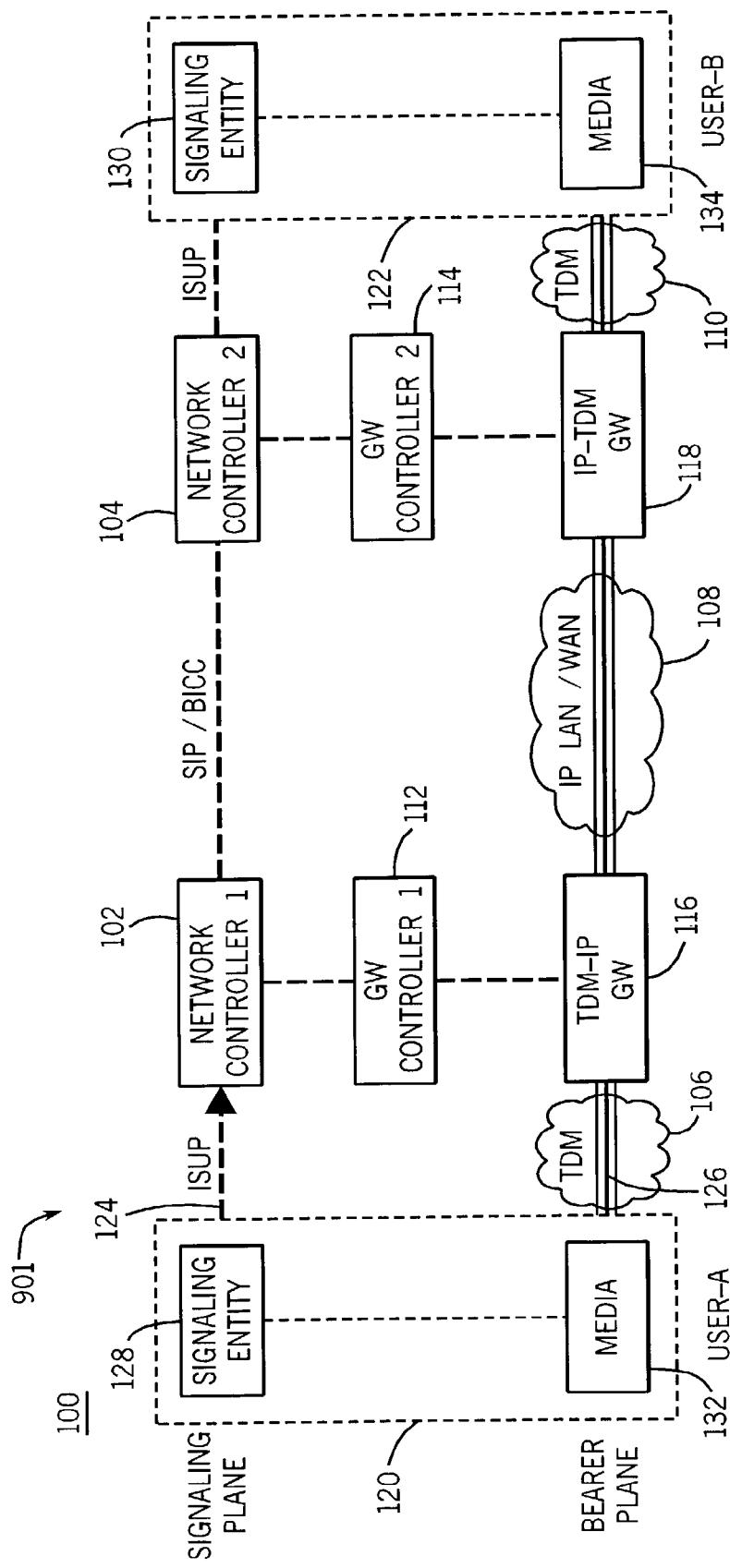

Turning to FIG. 9, exemplary configuration 901 of the apparatus 100 serves to illustrate a connection of the network 106 to the network 110 through the network 108. The configuration 701 comprises the same architecture described in the configuration 801, however the one or more network controllers 102 and 104 employ an internet protocol wide area network or local area network as the network 108. The gateway 116 translates communication on the bearer path 126 from time division multiplexing communication to internet protocol communication. The gateway 118 translates communication on the bearer path 126 from internet protocol communication to time division multiplexing communication.

An illustrative description of exemplary operation of the apparatus 100 is now presented, for explanatory purposes. The illustrative description shows how offer/answer messages are used to set up one connection requirement, for example, network type negotiation. The offer/answer messages comprise connection information, for example, a network type, a network address type, and a network address. Other types of connection requirements such as coder-decoder ("codec") negotiation are also exchanged in the offer/answer messages.

Figure 10:
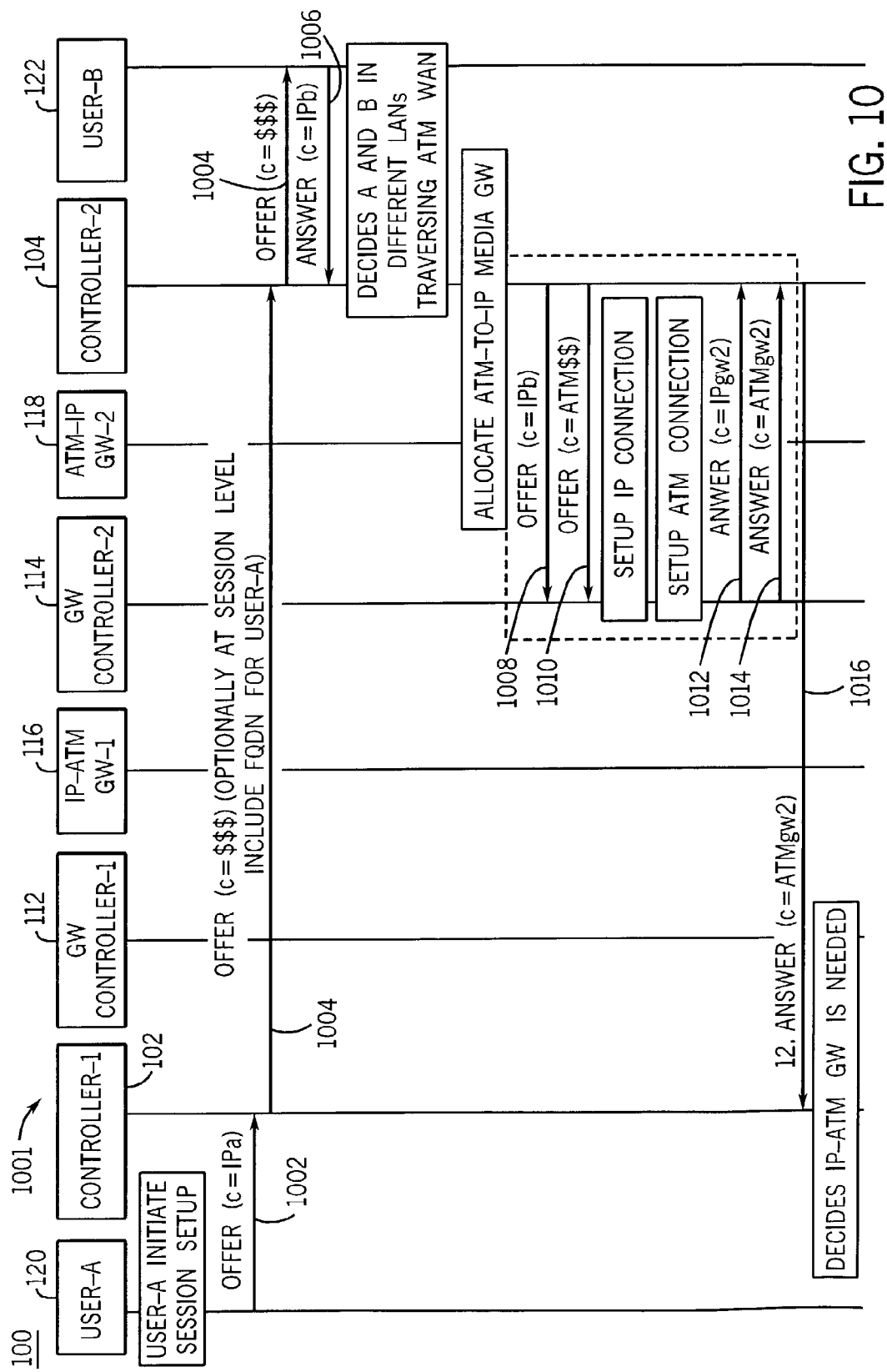
FIGS. 10 and 11 are representations of exemplary message flow for a connection of a first user of a first network of the one or more networks to a second user of a second network of the one or more networks of the apparatus of FIG. 1.
Figure 11:
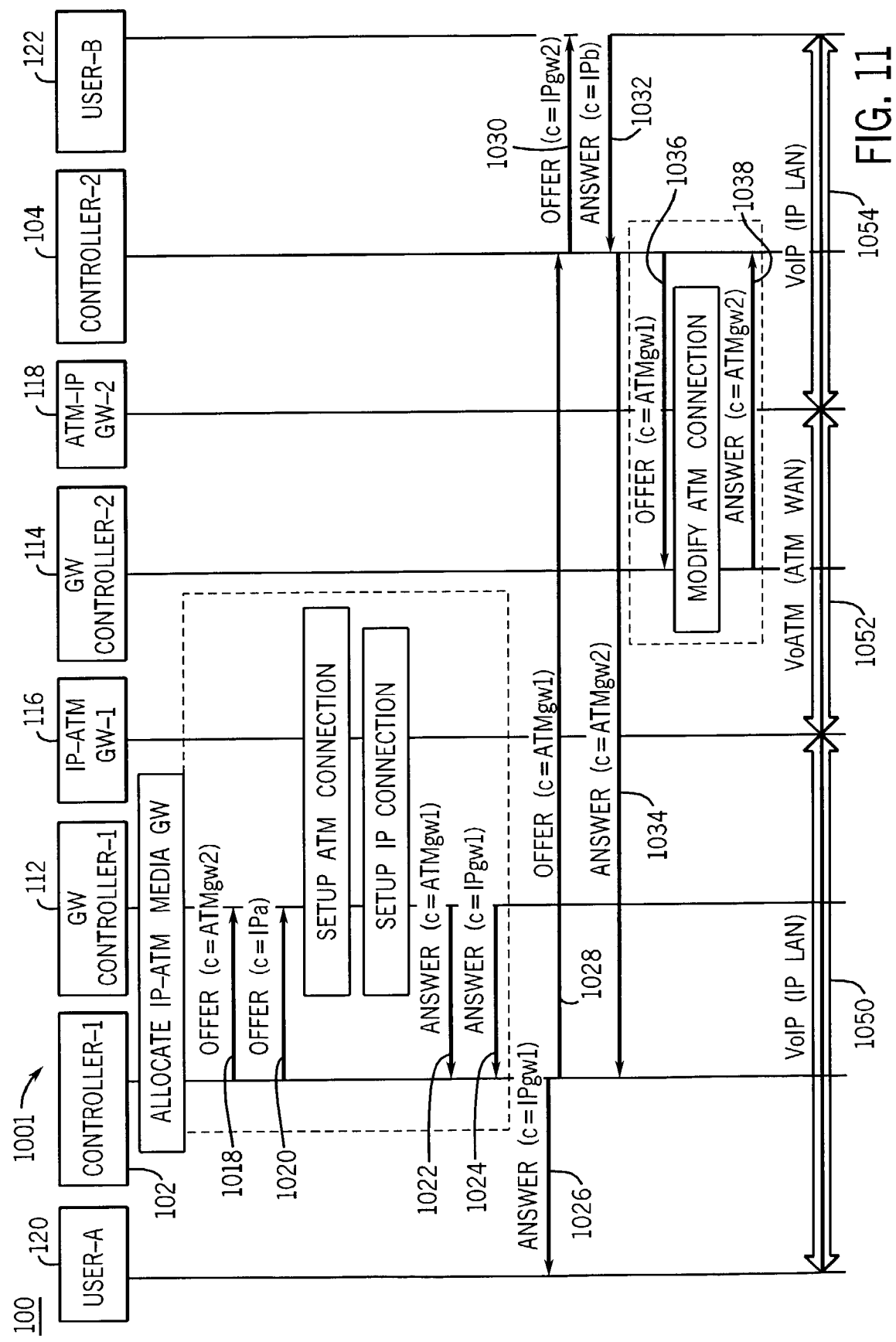

Turning to FIGS. 2, 10, and 11, a call flow 1001 represents one exemplary network negotiation from the user 120 to the user 122 through the configuration 201. The user 120 initiates a communication session by generating an offer 1002, for example, a session description protocol offer. The offer 1002 comprises connection information of the user 120 for the communication session. The connection information comprises a network type, an address type, and an address of the user 120. In one example, the network type comprises an internet ("IN") and the address type comprises an internet protocol version four ("IPv4") type. "c=IN IPv4 address" in one example serves to represent the connection information of the user 120. The address parameter may be a physical internet protocol version four address or a fully qualified domain name ("FQDN").

Two types of connection information (session connection information and media connection information) exist in the session description protocol. The session connection information and the media connection information both use the same message format. If available, the media connection information overrides the session connection information.

In one example, the offer 1002 comprises the session description protocol offer. The address parameter comprises the physical internet protocol version four address or a physical internet protocol version six ("Ipv6") address. In another example, the offer 1002 comprises a time division multiplexing offer. In yet another example, the offer 1002 comprises an asynchronous transfer mode offer. "c=IPa" in one example serves to represent the connection information of the user 120 in the offer 1002. "c=IPa" is shorthand notation for a correctly formatted session description protocol connection information representing a specific internet protocol version four, internet protocol version six, or asynchronous transfer mode physical address.

The user 120 sends the offer 1002 to the network controller 102. The network controller 102 is able to allocate the gateway 116 to the bearer path 126 to convert between network types, but the network controller 102 is not yet sure the gateway 116 is necessary. To determine if the gateway 116 is necessary the network controller 102 communicates with the network controller 104. The network controller 102 modifies the offer 1002 to generate an offer 1004. The network controller 102 places wild card media connection information in the offer 1004 to replace the connection information of the offer 1002. Wild card media connection information indicates a willingness to consider among multiple choices for the network type and address parameters. "c=$ $ $" or "c= - - - " in one example serves to represent the connection information of the wild card media connection information in the offer 1004 as described in R. Kumar and M. Mostafa; "Conventions for the Use of the Session Description Protocol (SDP) for ATM Bearer Connections"; Network Working Group, Request for Comments (RFC) 3108; May 2001; 97 pgs.; www.ietf.org/rfc/rfc3108.txt?number=3108. In one example, the session connection information comprises the fully qualified domain name in the address parameter. The fully qualified domain name represents a domain of the network 106 associated with the user 120.

In one example, the offer 1004 comprises a session description protocol offer. The network controller 102 sends the session description protocol offer to the network controller 104. If the interface between the network controller 104 and the user 122 supports session description protocol, then the network controller 104 forwards the offer 1004 to the user 122. If the interface between the network controller 104 and the user 122 does not support session description protocol, then the network controller 104 sends a protocol offer equivalent to the session description protocol offer to the user 122. If wild card media connection information is not supported on the interface between the network controller 104 and the user 122, then the network controller 104 requests gateway controller 114 to immediately allocate a gateway context in gateway 118, rather than waiting until receipt of answer 1006, and modifies the connection information of the offer 1004 to comprise connection information of the gateway 118 before sending the offer 1004 to the user 122.

The user 122 responds to the offer 1004 by sending an answer 1006 to the network controller 104. The answer 1006 comprises the connection information of the user 122. In one example, the address parameter of the connection information comprises an internet protocol version four address. "c=IPb" in one example serves to represent the connection information of the user 122 in the answer 1006.

The network controller 104 examines the connection information of the users 120 and 122 and the respective networks 106 and 110 of the users 120 and 122. If the fully qualified domain name of the network 106 was included in offer 1004 to the network controller 104, then the network controller 104 may compare the fully qualified domain name of the network 106 with a provisioned information list of fully qualified domain names with which the network controller 104 has internet protocol media connectivity. If the fully qualified domain name of the network 106 is in the provisioned information list, then the network controller 104 may choose to establish internet protocol media connectivity with the network 106. In one example, the network controller 104 is configured to use an asynchronous transfer mode wide area network as a default interworking network for disconnected networks, for example, networks 106 and 110. If the fully qualified domain name of the network 106 is not on the provisioned information list, then the network controller 104 may choose to establish asynchronous transfer mode media connectivity between the networks 106 and 110. The choice between establishing internet protocol media connectivity or asynchronous transfer mode media connectivity determines the type of wide area network to use between the networks 106 and 110. To make the choice, the network controller 104 will examine available address information from the offer 1004 and the answer 1006.

In the call flow 1001, the network controller 104 determines that the user 120 and the user 122 are in disconnected networks, for example, networks 106 and 110 without internet protocol media connectivity. The network controller 104 determines to use the default interworking network (i.e., asynchronous transfer mode wide area network) to couple the networks 106 and 110.

The network controller 104 sends an offer 1008 to the gateway controller 114 to request allocation of an internet protocol termination in the gateway 118. The offer 1008 comprises the connection information of the user 122. "c=IPb" in one example serves to represent the connection information of the user 122 in the offer 1008.

The network controller 104 sends an offer 1010 to the gateway controller 114 to request allocation of an asynchronous transfer mode termination in the gateway 118. The offer 1010 comprises wild card media connection information of an asynchronous transfer mode network. "c=ATM - - -" or "c=ATM $ $" in one example serve to represent the connection information of the wild card media connection information of the asynchronous transfer mode network in the offer 1010. The offers 1008 and 1010 may be carried in a single session description protocol offer as separate media lines.

The gateway controller 114 allocates a context within the gateway 118 comprising the internet protocol termination. The gateway controller 114 adds the asynchronous transfer termination to the context within the gateway 118. The gateway controller 114 may allocate the context within the gateway 118 comprising the internet protocol termination and the asynchronous transfer mode termination in a single transaction with the gateway 118.

When the context termination connection information is complete after receipt of offer 1036, the internet protocol termination sends media information after any necessary processing to the asynchronous transfer mode termination. The asynchronous transfer mode termination sends media information after any necessary processing to the internet protocol termination. The gateway 118 comprises an asynchronous transfer mode to internet protocol conversion.

The gateway controller 114 sends an answer 1012 to the network controller 104. The answer 1012 comprises the connection information of the internet protocol termination of the context within the gateway 118. The connection information comprises the internet protocol address of the internet protocol termination. "c=IPgw2" in one example serve to represent the connection information of the internet protocol termination in the answer 1012.

The gateway controller 114 sends an answer 1014 to the network controller 104. The answer 1014 comprises the connection information of the asynchronous transfer mode termination of the context within the gateway 118. The connection information comprises the asynchronous transfer mode address of the asynchronous transfer mode termination. "c=ATMgw2" in one example serve to represent the connection information of the asynchronous transfer mode termination in the answer 1014. The gateway controller 114 may send the answers 1012 and 1014 in a single transaction to the network controller 104.

The network controller 104 sends an answer 1016 to the network controller 102. The answer 1016 comprises an address in the networks 108 and 110. The user 120 will establish media communication with the address in the network 108 and 110. In one example, the network controller 104 has allocated the gateway 118. Therefore, the address in the network 108 corresponds to the asynchronous transfer mode address of the asynchronous transfer mode termination or the internet protocol address of the internet protocol termination within the context of the gateway 118. "c=ATMgw2" in one example serves to represent the connection information of the answer 1016.

The network controller 102 compares the connection information of the offer 1002 and the connection information of the answer 1016. If the network type indicated in the connection information of the offer 1002 is different from the network type indicated in the connection information of the answer 1016, then the network controller 102 determines that the gateway 116 is needed to translate between the different network types.

The network controller 102 sends an offer 1018 to the gateway controller 112 to request allocation of an asynchronous transfer mode termination in the gateway 116. The offer 1018 comprises the connection information of the asynchronous transfer mode address of the asynchronous transfer mode termination in the gateway 118. "c=ATMgw2" in one example serves to represent the connection information of the offer 1018.

The network controller 102 sends an offer 1020 to the gateway controller 112 to request allocation of an internet protocol termination in the gateway 116. The offer 1020 comprises the connection information of the user 120. "c=IPa" in one example serves to represent the connection information of the offer 1020. The offers 1018 and 1020 may be carried in a single session description protocol offer as separate media lines.

The gateway controller 112 allocates a context within the gateway 116 comprising the asynchronous transfer termination. The gateway controller 112 adds the internet protocol termination to the context within the gateway 116. The gateway controller 112 may allocate the context within the gateway 116 comprising the asynchronous transfer mode termination and the internet protocol termination in a single transaction with the gateway 116.

The internet protocol termination sends media information after any necessary processing to the asynchronous transfer mode termination. The asynchronous transfer mode termination sends media information after any necessary processing to the internet protocol termination. The gateway 116 comprises an internet protocol to asynchronous transfer mode conversion.

The gateway controller 112 sends an answer 1022 to the network controller 102. The answer 1022 comprises the connection information of the asynchronous transfer mode termination of the context within the gateway 116. The connection information comprises the asynchronous transfer mode address of the asynchronous transfer mode termination. "c=ATMgw1" in one example serves to represent the connection information of the asynchronous transfer mode termination in the answer 1022.

The gateway controller 112 sends an answer 1024 to the network controller 102. The answer 1024 comprises the connection information of the internet protocol termination of the context within the gateway 116. The connection information comprises the internet protocol address of the internet protocol termination. "c=IPgw1" in one example serves to represent the connection information of the internet protocol termination in the answer 1024. The gateway controller 114 may send the answers 1022 and 1024 in a single transaction to the network controller 102.

The network controller 102 sends an answer 1026 to the user 120. The answer 1026 comprises an address in the networks 106, 108, and 110. The user 120 will establish media communication with the address in the networks 106, 108, and 110. In one example, the network controller 102 has allocated the gateway 116. Therefore, the address in the network 106 corresponds to the asynchronous transfer mode address of the asynchronous transfer mode termination or the internet protocol address of the internet protocol termination within the context of the gateway 116. "c=IPgw1" in one example serves to represent the connection information of the answer 1026.

The network controller 102 sends an offer 1028 to the network controller 104. The offer 1028 comprises the connection information of the user 120 or the network 108 termination within the context of the gateway 116. In one example, offer 1028 comprises the connection information of the asynchronous transfer mode termination within the context of the gateway 116. "c=ATMgw1" in one example serves to represent the connection information of the offer 1028. The network controller 104 modifies the offer 1028 to generate an offer 1030. The network controller 104 replaces the connection information of the offer 1028 with the connection information of the internet protocol termination in the gateway 118, if it has been allocated. "c=IPgw2" in one example serves to represent the connection information of the offer 1030.

The network controller 104 sends an offer 1030 to the user 122. The user 122 responds to the offer 1030 with an answer 1032. The answer 1032 comprises the connection information of the user 122. "c=IPb" in one example serves to represent the connection information of the user 122 of the answer 1032.

The network controller 104 responds to the offer 1028 with an answer 1034. The answer 1034 comprises the address in the network 110 where the user 120 may establish the media communication. The network controller 104 sends the answer 1034 to the network controller 102.

The network controller 104 sends an offer 1036 to the gateway controller 114. The offer 1036 comprises the connection information of the offer 1028. The offer 1036 modifies the asynchronous transfer mode termination or the internet protocol termination of the gateway 118. In one example, the gateway controller 114 communicates with the gateway 118 to modify the asynchronous transfer mode termination in the gateway 118. "c=ATMgw1" in one example serves to represent the connection information of the offer 1036. The gateway controller 114 responds to the offer 1036 with an answer 1038. The answer 1038 comprises the connection information of the answer 1014. "c=ATMgw2" in one example serves to represent the connection information of the answer 1038.

The end-to-end media path is established and ready to support a session between the users 120 and 122. The user 120 will communicate with the gateway 116 through media path 1050. The media path 1050 supports internet protocol communications, for example, voice over internet protocol ("VoIP"). The gateway 116 will communicate with the gateway 118 through media path 1052. The media path 1052 supports asynchronous transfer mode communications, for example, voice over asynchronous transfer mode ("VoATM"). The gateway 118 will communicate with the user 122 through media path 1054. The media path 1054 supports internet protocol communications, for example, voice over internet protocol.

Figure 12:
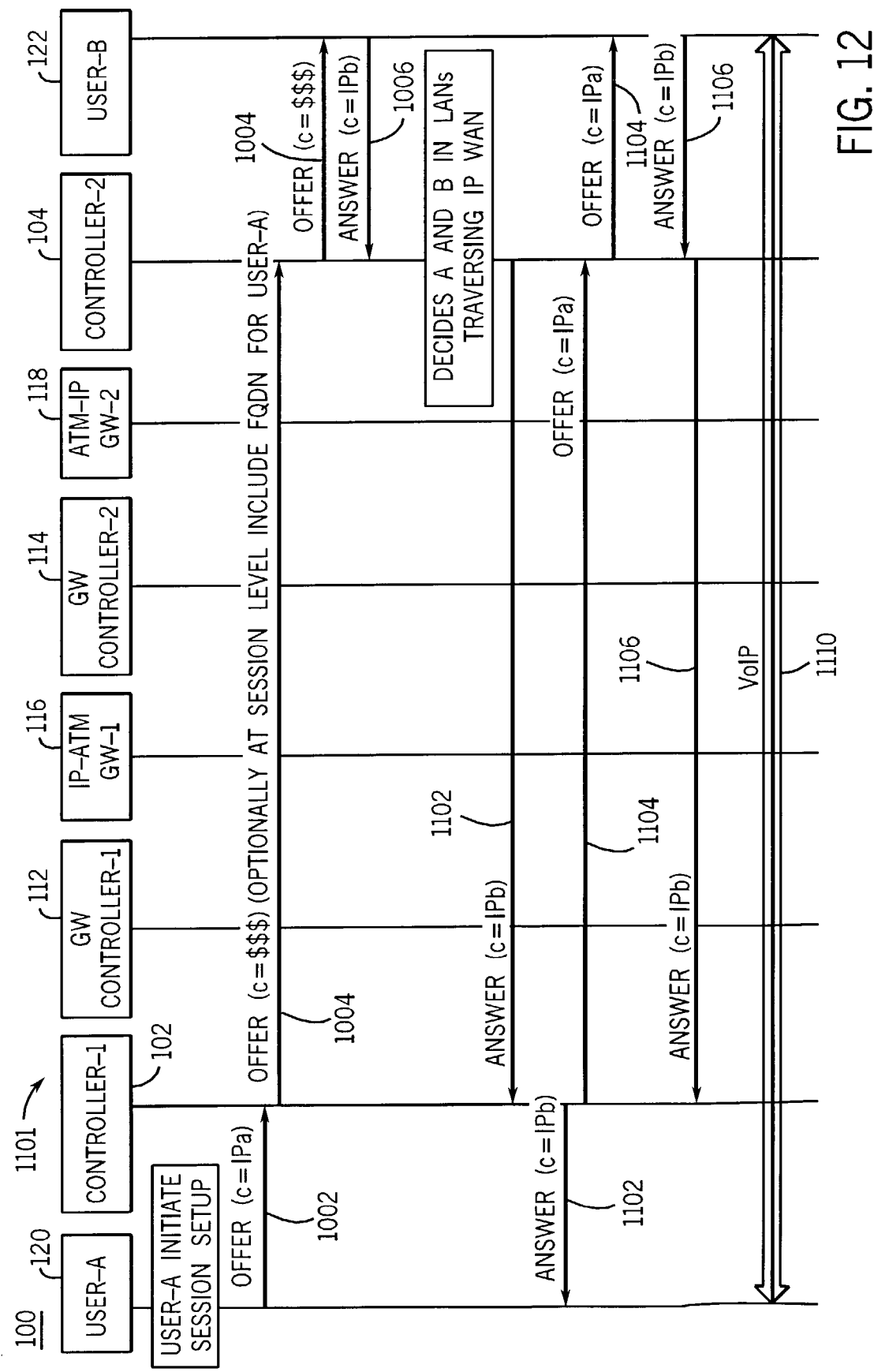
FIG. 12 is a representation of another exemplary message flow for a connection of a first user of a first network of the one or more networks to a second user of a second network of the one or more networks of FIG. 1.

Turning to FIGS. 3 and 12, a call flow 1101 represents one exemplary network negotiation from the user 120 to the user 122 through the configuration 301. The configuration 301 and the call flow 1101 comprises the same architecture described in the configuration 201 and the call flow 1001, however in configuration 301 and the call flow 1101 the network 108 comprises an internet protocol wide area network. Offers 1002 and 1004, and answer 1006 are generated, processed, and propagated as described in the call flow 1001.

The call flow 1101 diverges from the call flow 1001 at the point where the network controller 104 examines the connection information of the users 120 and 122 and the respective networks 106 and 110 of the users 120 and 122. If the networks 106 and 110 are able to be coupled using internet protocol connectivity, then the network controller 104 may choose between internet protocol and asynchronous transfer mode to connect the networks 106 and 110. For example, if the fully qualified domain name of the network 106 is on the provisioned information list of fully qualified domain names with which the network controller 104 has internet protocol media connectivity, then the network controller 104 may choose to establish internet protocol or asynchronous transfer mode media connectivity with the network 106. The network controller 104 employs one or more characteristics of a communication path between the users 120 and 122 to choose between the use of internet protocol and asynchronous transfer mode to connect the networks 106 and 110. In one example, the communication path between the users 120 and 122 is a relatively long distance. Therefore, the network controller 104 may choose to use an asynchronous transfer mode wide area network to connect the networks 106 and 110 as the more efficient network to cover the long distance. In another example, the communication path between the users 120 and 122 is a relatively short distance. Therefore, the network controller 104 may choose to use an internet protocol wide area network to connect the networks 106 and 110 as the less costly network to cover the short distance.

In one example, the network controller 104 determines to use the internet protocol wide area network to connect the networks 106 and 110 with the network 108 as shown in the configuration 301. Therefore, gateways 116 and 118 are not needed to translate between internet protocol and asynchronous transfer mode networks. The network controller 104 sends an answer 1102 to the network controller 102. The answer 1102 comprises the connection information of the user 122. In one example, the address parameter of the connection information comprises an internet protocol version four address. "c=IPb" in one example serves to represent the connection information of the user 122 in answer 1102. The network controller 102 forwards the answer 1102 to the user 120.

The network controller 102 sends an offer 1104 to the network controller 104. The offer 1104 comprises the connection information of the user 120. In one example, the address parameter of the connection information comprises an internet protocol version four address. "c=IPa" in one example serves to represent the connection information of the user 122 in the offer 1104. The network controller 104 forwards the offer 1104 to the user 122.

The user 122 sends an answer 1106 to the network controller 104. The answer 1106 comprises the connection information of the user 122. "c=IPb" in one example serves to represent the connection information of the user 122 in the offer 1106. The network controller 104 forwards the answer 1106 to the network controller 102.

The end-to-end media path is established and ready to support a session between the users 120 and 122. The user 120 will communicate with the user 122 through media path 1110. The media path 1110 supports internet protocol communications, for example, voice over internet protocol.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   one or more network controllers that serve to communicatively couple a first network component with a second network component, wherein the first network component sends a signaling message for the second network component to one or more of the one or more network controllers, wherein the signaling message comprises an indication of one or more media connections usable by the first network component;
   wherein one or more of the one or more network controllers serve to replace the indication of the one or more media connections usable by the first network component in the signaling message with wild card media connection information indicating the second network component is allowed to indicate to one or more of the one or more network controllers one or more media connections usable by the second network component and the wild card media connection information serves to direct the second network component to generate a reply signaling message comprising an indication of one or more of the one or more media connections usable by the second network component, and
   wherein the one or more of the one or more network controllers employ the indication of the one or more specific media connections usable by the first network component and the indication of the one or more specific media connections usable be the second network component to select one or more networks from a plurality of available networks for media connection of the first network component with the second network component.

2. The apparatus of claim 1, wherein the signaling message comprises a session description protocol offer message within an session initiation protocol or bearer independent call control message, wherein the session description protocol offer message that comprises an indication of a network type, network address type, and network address that corresponds to the first network component.

3. The apparatus of claim 2, wherein one of the one or more network controllers serve to replace the indication of the network type, network address type, and network address that corresponds to the first network component in the session initiation protocol offer message with an indication of a wild card network type, wild card network address type, and wild card network address.

4. The apparatus of claim 1, wherein the first network component is supported by a first local area network, wherein the second network component is supported by a second local area network;
   wherein the first local area network and the second local area network serves to support one or more network protocol technologies;
   wherein one or more of the one or more network controllers select a wide area network from the plurality of available networks to support one or more of the one or more network protocol technologies for connection of the first local area network with the second local area network.

5. The apparatus of claim 1, wherein the first network component is supported by a first local area network, wherein the second network component is supported by a second local area network;
   wherein the first local area network and the second local area network support one or more network protocol technologies;
   wherein one or more of the one or more network controllers select a wide area network that supports a different network protocol technology than the one or more network protocol technologies from the plurality of available networks to connect the first local area network with the second local area network;
   wherein the one or more of the one or more network controllers allocate a first gateway to interface the first local area network to the wide area network, wherein one or more of the one or more network controllers allocate a second gateway to interface the second local area network to the wide area network.

6. The apparatus of claim 1, wherein one or more of the first and second network components support internet protocol network technology, wherein the plurality of networks comprise one or more of an internet protocol network, an asynchronous transfer mode network, and a time division multiplexing network;
   wherein one or more of the one or more network controllers select the internet protocol network from the plurality of networks to connect to the one or more of the first and second network components.

7. The apparatus of claim 6, wherein the one or more of the one or more network controllers select the internet protocol network to connect to the one or more of the first and second network components to avoid translation of communication to and/or from the one or more of the first and second network components.

8. The apparatus of claim 6, wherein the one or more of the one or more network controllers select the internet protocol network to connect to the one or more of the first and second network components due to the distance to the one or more of the first and second network components.

9. The apparatus of claim 1, wherein the second network component sends the reply signaling message to one or more of the one or more network controllers;
   wherein the one or more of the one or more network controllers employ the indication of the one or more specific network connections useable by the first network component and the indication of the one or more specific network connections useable by the second network component to determine whether to allocate a gateway to translate between a first network protocol technology of the first network component and a second network protocol technology of the second network component.

10. The apparatus of claim 1, wherein the indication of the one or more specific network connections useable by the first network component comprises a fully qualified domain name of the first network component;
    wherein one or more of the one or more network controllers have access to a list of fully qualified domain names that the one or more of the one or more network controllers can reach through an internet protocol network;

wherein the one or more of the one or more network controllers compare the fully qualified domain name to the list of fully qualified domain names, wherein if the fully qualified domain name is on the list of fully qualified domain names then one or more of the one or more network controllers will connect the first network component with the second network component through the internet protocol network.

11. The apparatus of claim 1, wherein the one or more network controllers comprise a first network controller and a second network controller, wherein the first network controller serves a first communication endpoint, wherein the second network controller serves a second communication endpoint;

wherein the first communication endpoint initiates a communication session with the second communication endpoint by sending the indication of the one or more specific network connections usable by the first network component in the signaling message to the first network controller;

wherein the first network controller sends the indication of the one or more specific network connections usable by the first network component in the signaling message to the second network controller;

wherein the second network controller replaces the indication of the one or more specific network connections usable by the first network component in the signaling message with the wild card network connection information;

wherein the second network controller sends the wild card network connection information in the signaling message to the second communication endpoint.

12. The apparatus of claim 1, wherein one or more of the one or more network controllers serve to allocate one or more gateways to translate between a first network protocol technology of the first network component and a second network protocol technology of the second network component.

13. The apparatus of claim 1, wherein one or more of the one or more network controllers use the wild card network connection information in the signaling message to discover connection information of the second network component.

14. The apparatus of claim 1, wherein the one or more network controllers comprise one or more of a session initiation protocol back to back user agent and an internet protocol multimedia subsystem media gateway control function.

15. A method, comprising the steps of:
receiving at a network controller a specific media connection information parameter of a first network component for set up of a communication session with a second network component;
modifying at the network controller the specific media connection information parameter to allow the second network component to determine a specific media connection information parameter of the second network component for set up of the communication session with the first network component by replacing the specific media connection information parameter of the first network component with a wild card media connection information parameter; and by sending the wild card media connection information parameter in a session initiation protocol offer message to the second network component; and selecting with the network controller one or more networks form a plurality of available networks to communicatively couple the first network component with the second network component based on one or more of the specific media connection information parameters of the first network component and the specific media connection information parameters of the second network component.

16. The method of claim 15, wherein the first network component supports a first network protocol technology and the second network component supports a second network protocol technology, wherein the step of selecting the network from the plurality of available networks to communicatively couple the first network component with the second network component based on the one or more of the specific media connection information parameters of the first network component and the specific media connection information parameters of the second network component comprises the steps of:

detecting a difference between the first network technology and the second network technology at a boundary between a first network and a second network, wherein the first network and the second network serve to support the first network component and second network component, respectively; and allocating a gateway to interface the first network with the second network and to translate between the first network technology and the second network technology at the boundary between the first network and the second network.

17. The method of claim 15, wherein the specific media connection information parameter of the first network component comprises a fully qualified domain name of the first network component, wherein the step of selecting one or more networks from the plurality of available networks to communicatively couple the first network component with the second network component based on the one or more of the specific media connection information parameters of the first network component and the specific media connection information parameters of the second network component comprises the steps of:

determining the network technology employed by the first network component from the fully qualified domain name of the first network component; and comparing the fully qualified domain name of the first network component to a list of fully qualified domain names that may be connected by the one of the plurality of networks that supports the network technology employed by the first network.

18. An article, comprising:
one or more recordable data storage medium; and means in the one or more medium for receiving at a network controller a specific media connection information parameter of a first network component for set up of a media communication session with a second network component;

means in the one or more medium for modifying at the network controller the specific media connection information parameter to allow the second network component to determine a specific media connection information parameter of the second network component for set up of the media communication session with the first network component by replacing the specific media connection information parameter of the first network component with a wild card media connection information parameter; and by sending the wild card media connection information parameter in a session initiation offer message to the second network component; and means in the one or more medium for selecting with the network controller a network from a plurality of available networks to communicatively couple the first network component with the second network component based on one or more of the specific media connection information parameters of the first network component and the specific media connection information parameters of the second network component.

* * * * *